Nov. 11, 1969    D. L. HORROCKS ETAL    3,478,208
2-ARYL INDOLES AND METHODS FOR THEIR USE
Filed Jan. 4, 1967    3 Sheets-Sheet 1
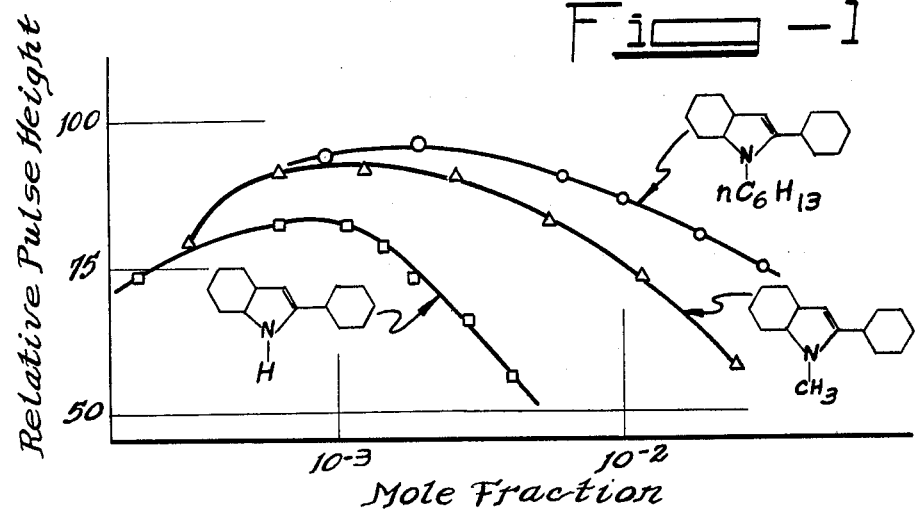
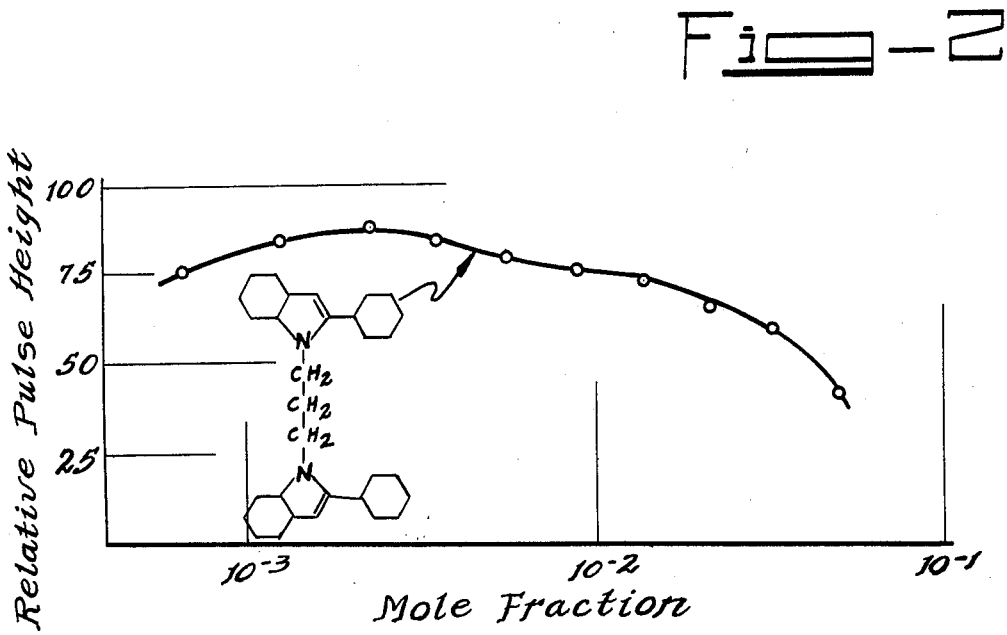
Inventors
Donald L. Horrocks
Hermann O. Wirth
By: *Attorney*

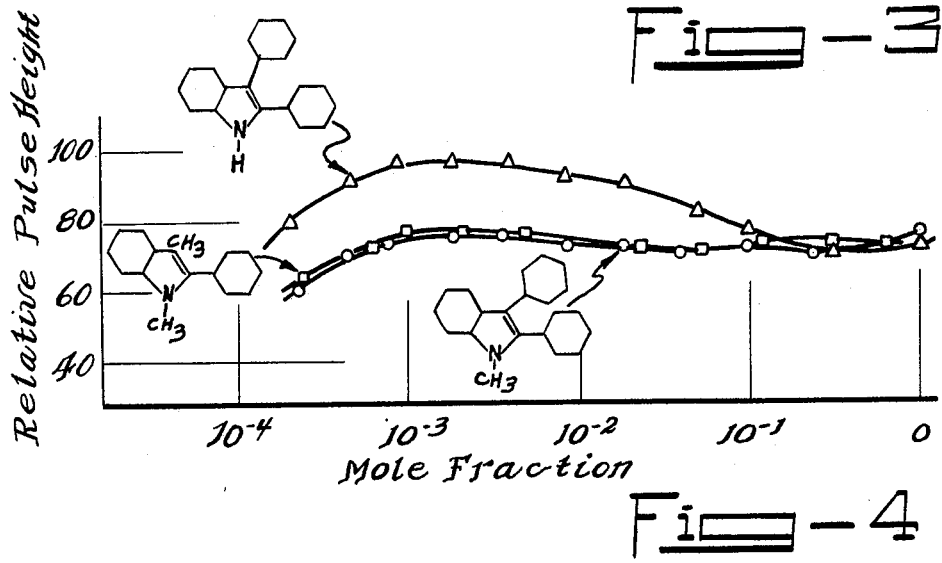
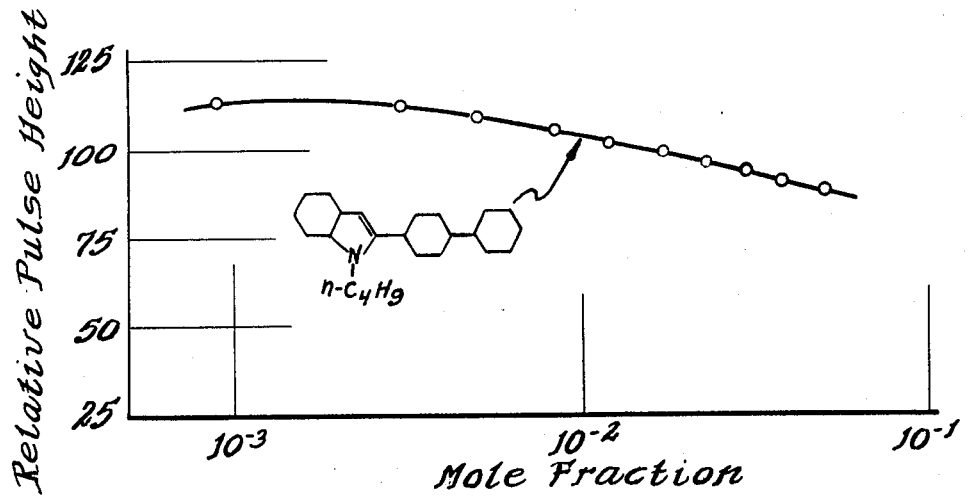

Inventors
Donald L. Horrocks
Hermann O. Wirth
Attorney

United States Patent Office 3,478,208
Patented Nov. 11, 1969

3,478,208
2-ARYL INDOLES AND METHODS FOR THEIR USE
Donald L. Horrocks, Naperville, and Hermann O. Wirth, Argonne, Ill., assignors to the United States of America as represented by the United States Atomic Energy Commission
Filed Jan. 4, 1967, Ser. No. 607,610
Int. Cl. G01t 1/20
U.S. Cl. 250—71.5                                         2 Claims

ABSTRACT OF THE DISCLOSURE

Various 2-aryl indoles which have been found useful as organic scintillators in toluene solution are described. These include, for example, N-n-butyl-2-biphenylindole, N-methyl-2-phenyl-3-methyindole and N-methyl-3,2'-ethylene-2-phenylindole. Also described are several glasses including N-n-butyl-3,2'-ethylene-2-phenylindole—which is useful per se as an organic scintillator.

CONTRACTUAL ORIGIN OF THE INVENTION

The invention described herein was made in the course of, or under a contract with the United States Atomic Energy Commission.

BACKGROUND OF THE INVENTION

This invention relates to a method for detecting and measuring ionizing radiation. The invention also relates to a new composition of matter suitable for use as organic scintillators and specifically to new 2-aryl indoles from which the new compositions of matter are prepared.

Scintillation counters are in widespread use at the present time for the detection and measurement of ionizing radiation. The materials used include organic solutions, organic and inorganic crystals and inert gases.

We have discovered that 2-aryl indoles having a more complex structural formula than the simplest of these compounds—2-phenylindole—when dissolved in an aromatic solvent or also in an undiluted glass-like state, are favorable organic scintillator solutes even though 2-phenylindole is itself not so useful because of the very strong self-quenching exhibited by this compound.

Self-quenching is the dissipation of excitation energy between two molecules of the scintillator and is caused by the association of two solute molecules (one in an excited state) to form a photodimer (sometimes called an excimer). These excimers then decay by a process which does not produce light. At high solutes concentrations, the photodimer formation decreases the scintillation yield of the excited monomer molecule. Since a high solute concentration is desirable to obtain fast life times, a compound exhibiting strong self-quenching is not useful as a scintillator.

SUMMARY OF THE INVENTION

We have found that 2-aryl indoles more complicated in structural formula than 2-phenylindole exhibit much less self-quenching than does 2-phenylindole. In fact, certain of these compounds yield more light than does diphenyloxazole,

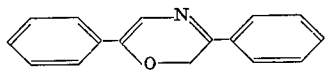

known to the art as "PPO," which is universally accepted as the standard for solution scintillation counting. Hereafter, whenever a structural formula includes the group

this is to be understood as a benzene ring rather than the cyclohexene ring.

It has been found that self-quenching occurs only if all of the following requirements are satisfied:
(1) The scintillator molecule has a coplanar chromophore system,
(2) Two of the molecules can approach each other close enough to form an association, and
(3) There is possible a complete mirror image overlay of the entire chromophore systems of the two molecules.

We have found that self-quenching can be reduced or entirely prevented by:
(1) Introducing a protecting bulky group into the molecule which will prevent the close approach of the two molecules, or
(2) Introducing a group into the molecule which will destroy the coplanarity of the chromophore system.

By selection of the size and structure of the bulky group, self-quenching can be completely eliminated. It is also possible to completely eliminate self-quenching by introducing a group into the molecule which will destroy the coplanarity of the chromophore system, responsible for the scintillation.

BRIEF DESCRIPTION OF THE DRAWING

FIGS. 1 to 6 are graphs showing the relative scintillation efficiency (Sc$^{137}$ electron excitation) vs. concentration (Mole fraction) curves of 2-aryl indole compounds in toluene as solvent.

DESCRIPTION OF THE PREFERRED EMBODIMENTS

Figure 5:
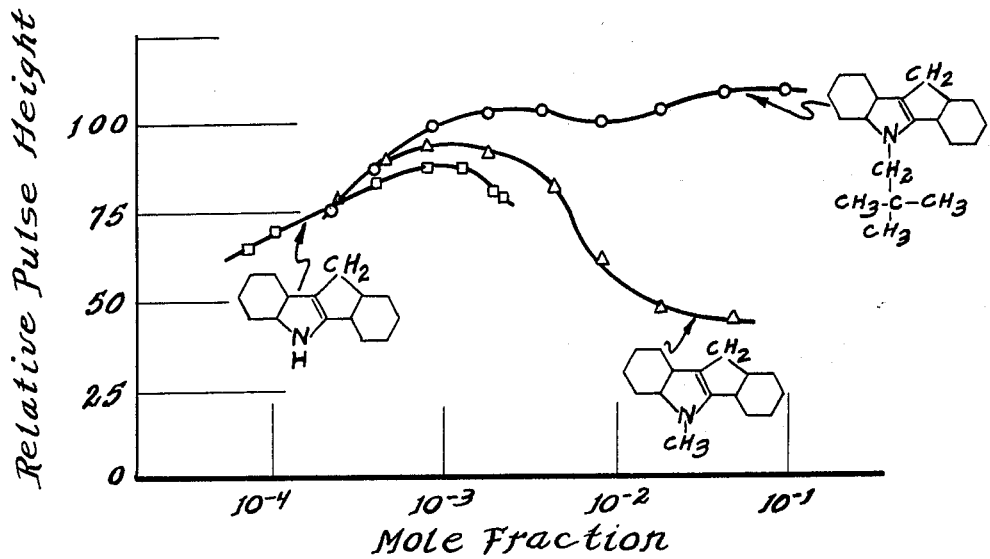

Introduction of a bulky group into the molecule can be done in previously known ways. For example, compounds of the class

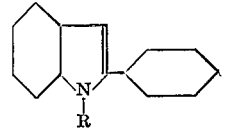

wherein R is an alkyl radical, an aryl radical or an alkaryl radical, can be prepared in general by reacting 2-phenylindole with alkykl halides in the presence of an alkali such as KOH, or by treating 2-phenylindole with an aryl iodide in the presence of an alkali carbonate such as $K_2CO_3$ and also in the presence of catalytic amounts of copper powder. Preparation of such compounds is described in Examples 1 and 2.

Example 1

(I) A mixture of 19.3 g. 2-phenylindole, 8.4 g. potassium hydroxide and 40 ml. dimethylsulfoxide was heated under nitrogen and with stirring for about 1 hour at 100° C. After cooling to 20° C., 21.0 g. 1-bromohexane was added over a period of about 15 min. The reaction mixture was stirred for 12 hours and then heated to 80° C. over a period of 2 hours. The reaction product was worked up with water and ether, the organic phase washed several times with water, the solvent removed (rotation evaporator) and the oily residue chromatographed in petroleum ether over $Al_2O_3$, saturated with dry HCl gas. The final purification was achieved by high vacuum distillation. The N-hexyl-2-phenylindole thus prepared was found to have a boiling point of 135–140° C. at 10$^{-3}$ torr.

(II) The following 2-phenylindole derivatives have been prepared in a similar manner.
(1) N-methyl-2-phenylindole, M.P. 102° C. Crystallization from ether/methanol (cooling to −20° C.) after which the previously described chromatographic procedure has to be applied.
(2) N-octadecyl-2-phenylindole, M.P. 35° C. In this case the same procedure which is mentioned under (1) has to be followed.

(3) N-neopentyl-2-phenylindole, M.P. 86° C. In this case after adding the neopentyl-bromide the reaction mixture must be heated to 80° C. for 24 hours. The isolation and purification of this compound can be achieved according to procedures described above.

(III) The following 2-phenylindole derivatives may be prepared according to the above described procedures:
(1) N-duodecyl-2-phenylindole.
(2) N-cyclohexylmethyl-2-phenylindole.
(3) N-(2,2-diethyl-1-phenyl)-2-phenylindole.
(4) N-(2-ethyl-1-hexyl)-2-phenylindole.

Example 2

(I) A mixture of 19.3 g. 2-phenylindole, 13.8 g. potassium carbonate, 30.6 g. iodo-benzene and 0.5 g. copper powder was heated with stirring under a weak stream of nitrogen to 220° C. for 72 hours. After cooling, the reaction mixture was diluted with petroleum ether and this solution filtered in order to remove the unreacted 2-phenylindole. The petroleum ether solution was then chromatographed over a column of $Al_2O_3$ previously saturated with dry HCl gas. After removing the solvent the oily residue was dissolved in ethyl acetate/methanol and kept for some time at —20° C. to stimulate crystallization. To further purify the compound the chromatographic process (petroleum ether) was repated. The N-phenyl-2-phenylindole has a melting point of 81° C.

(II) N-(biphenylyl-4)-2-phenylindole and N-(p-terphenylyl-1')-2-phenylindole may be prepared in the same manner. So far as we are aware, except for N-methyl-2-phenylindole, these compounds have not heretofore been described in the literature.

The relative scintillation efficiency of these compounds in toluene solution was measured by exciting different solutions containing a specific amount of the solute with gamma radiation of known energy from cesium 137. The observed relative pulse height, RPH, of the edge of the Compton scattered electron spectrum is proportional to the relative light yield of the solution. FIGURE 1 shows a plot of the RPH obtained as a function of the solute concentration of 2-phenylindole, its $CH_3$ derivative and for its n-hexyl derivative. For self-quenching compounds there is a decrease of RPH at higher concentration with increasing solute concentration, whereas the RPH is constant at higher concentrations for compounds which exhibit no self-quenching. The increase in RPH at low concentrations is due to an increase in energy transfer efficiency with increasing concentration. The graph shows clearly the improvement obtained from mere addition of a methyl group to 2-phenylindole and the further improvement resulting from substitution of an n-hexyl group for the methyl group. It is believed that larger groups—particularly branched chain groups—would result in a further improvement, resulting in a complete elimination of self-quenching. Compounds which have only an H atom on the N atom showed very strong self-quenching. It is believed that this is due partly to the formation of hydrogen bonding between two molecules which produces a quenching process.

Additional compounds which we have prepared for the first time are

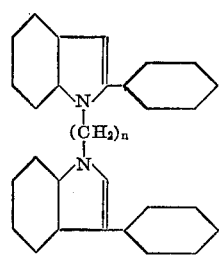

wherein $n$ is 3 to 10. Preparation of one is described in detail with Example No. 3.

Example 3

(I) A mixture of 19.3 g. 2-phenylindole, 8.5 g. potassium hydroxide, 40 ml. dimethylsulfoxide and 10.1 g. 1,3-dibromopropane was reacted as already described in Example No. 1. The purification was achieved by several crystallizations in ethanol and a chromatographic operation in toluene over $Al_2O_3$, saturated with dry HCl gas. The 1,3-bis[2-phenylindolyl-N]-propane has a melting point of 145°. C.

(II) In the same manner, 1,6-bis[2-phenylindol-H-)-hexane, and 1,10-bis[2-phenylindolyl-H-]decane may be prepared.

SCINTILLATION PROPERTIES

The above described compound where N is 3 has a maximum RPH value of 90% compared to the standard PPO-toluene-deaerated solution and, however, still has some self-quenching.

Other compounds in which a bulky group protects the chromophore are

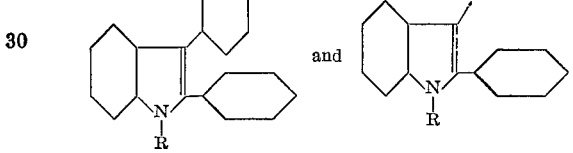

wherein R is —$CH_3$ or phenyl. The preparation of two of them is described in Example No. 4.

Example 4

(I) A mixture of 10.3 g. 3-methyl-2-phenylindole, 4.3 g. potassium hydroxide and 30 ml. dimethylsulfoxide was heated under nitrogen and with stirring for about 1 hour at 100° C. After cooling to 20° C. 10.7 g. methyl iodide was added over a period of about 15 min. and then the reaction mixture was stirred at room temperature for 12 hours. The reaction product was worked up with water and petroleum ether, the organic phase was washed several times with water and after drying the solution with calcium chloride a chromatographic operation over $Al_2O_3$, previously saturated with dry HCl gas, followed. The crystallization of the N-methyl-3-methyl-2-phenylindole was accomplished in ether/methanol by cooling to—20° C.; it melts at 69° C.

(II) According to the same procedure the N-methyl-2,3-diphenylindole, M.P. 139° C. (starting with 2,3-diphenylindole), could be achieved.

FIG. 3 shows the RPH value versus mole fraction for the above described compounds. The scintillation efficiency is only 75% of the standard PPO-toluene-deaerated solution but there is no self-quenching.

Another compound which is a good scintillator is N-butyl-2-(biphenylyl-4)-indole

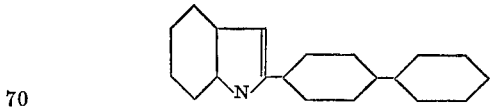

This compound was known before. FIG. 4 shows the RPH value versus mole fraction for this compound. The efficiency is quite high, 113% of standard PPO-toluene-deaerated solution, and the self-quenching is not too great.

Other compounds which we have prepared and hope to prepare include

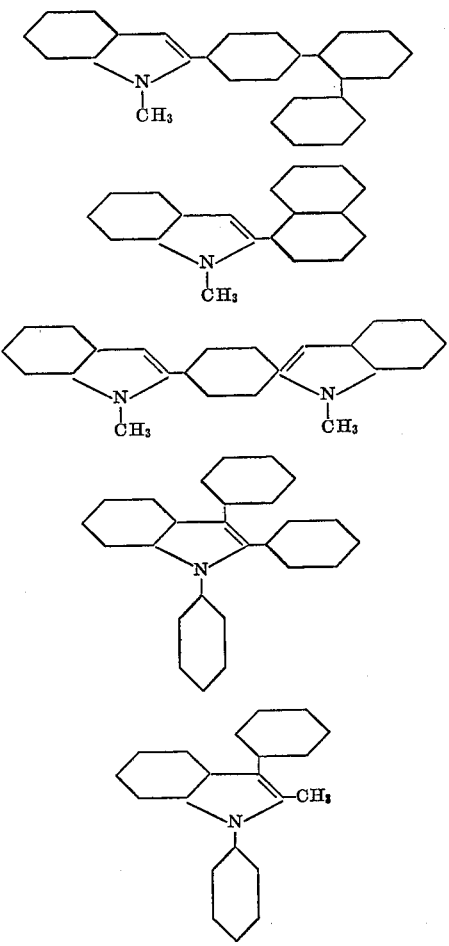

All these compounds should and do show improved scintillation properties over 2-phenylindole. To the best of our knowledge and belief, all these compounds also are novel.

As has been stated. compounds including an alkylene bridge linking the No. 3 carbon in the heterocyclic ring with the No. 2' carbon of the phenyl group in 2-phenylindole, as shown in the following formula

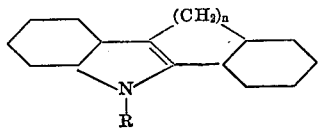

wherein $n$ is between 1 and 3 and R is a lower or medium size alkyl, aryl, or aralkyl group, have very favorable scintillation properties, especially when $n$ is 2, since in this case the coplanarity is destroyed; this means that self-quenchng is strongly reduced. Compounds of this type are prepared according to the Examples No. 5, No. 6, No. 7 and No. 8.

Example 5

(I) A mixture of 40 g. polyphosphorous acid, 13.2 g. 1-indanone and 12.2 g. 1-methyl-1-phenylhydrazine was heated gradually under nitrogen with stirring to 170° C. and kept at this temperature for 1 hour. After cooling to about 100° C., water was added and the precipitated crude product then isolated by filtration. A crystallization from toluene/methanol followed. The final purification was achieved by a chromatographic operation in xylene over $Al_2O_3$ at about 80° C. The N-methyl-3,2'-methylene-2-phenylindole melts at 156° C.

(II) According to the same procedure (starting with 1,1-diphenylhydrazine) N-phenyl-3,2'-methylene-2-phenylindole may be prepared.

Example 6

(I) A mixture of 11 g. 3,2'-methylene-2-phenylindole, 4,6 g. potassium hydroxide and 40 ml. dimethylsulfoxide was heated under nitrogen with stirring for about 1 hour to 100° C. After cooling to 80° C. 12.5 g. neopentylbromide was added and heating was continued with stirring for 24 hours. The reaction mixture was worked up with water/carbon tetrachloride. Crystallization succeeded by cooling the solution in petroleum ether to —20°. The purification was achieved by a chromatographic operation in petroleum ether over a column of $Al_2O_3$ previously saturated with dry HCl gas. The N-neopentyl-3,2'-methylene-2-phenylindole melts at 117° C. FIG. 5 shows the RPH versus mole fraction for this compound. The efficiency is 108% of the standard PPO-toluene solution and the bulky neopentyl group protects the chromophore from self-quenching. Interestingly, there is an observable increase in scintillation efficiency at very high concentrations.

(II) According to the same procedure may be prepared the following N-alkyl-3,2'-methylene-2-phenylindoles.
 (1) N-hexyl-3,2'-methylene-2-phenylindole
 (2) N-(2-ethylhexyl-1)-3,2'-methylene-2-phenylindole
 (3) N-(2,2-diethyl-1-pentyl)-3,2'-methylene-2 - phenylindole Example 7

(I) A mixture of 15 g. 3,2'-ethylene-2-phenylindole, 5.9 g. potassium hydroxide and 40 ml. dimethylsulfoxide was treated as already described in Example No. 1, with 12 g. methyl iodide. Isolation and purification was carried out by a chromatographic process as also described above. N-methyl-3,2'-ethylene-2-phenylindole melts at 136° C.

(II) The following N-alkyl-3,2'-ethylene - 2 - phenylindoles have been prepared in a similar manner:
 (1) N-ethyl-3,2'-ethylene-2-phenylindole M.P. 124° C.
 (2) N-propyl-3,2'-ethylene-2-phenylindole M.P. 100° C.
 (3) N-butyl-3,2'-ethylene-2-phenylindole M.P. 75° C.

(III) The following N-alkyl-3,2'-ethylene-2-phenylindoles may be prepared in a similar manner:
 (1) N-amyl-3,2'-ethylene-2-phenylindole.
 (2) N-neopentyl-3,2'-ethylene-2-phenylindole.
 (3) N-cyclohexylmethyl-3,2'-ethylene-2-phenylindole.

Example 8

(I) A mixture of 20 g. polyphosphorous acid, 9.2 g. 1,1-diphenylhydrazine and 7.6 g. α-tetralone was heated gradually under nitrogen with stirirng to 170° and kept at this temperature for 1 hour. After cooling to about 100° C., water and chloroform were added and this two phase solution was filtered in order to remove tarry impurities. The organic layer was chromatographed after drying with $CaCl_2$, over a column of $Al_2O_3$. The solvent was removed and the oily residue was treated with ether/methanol to achieve crystallization. After a second chromatographic purification in toluene over $Al_2O_3$, saturated previously with HCl gas, and crystallzation in ethyl acetate/methanol the pure N-phenyl-3,2'-ethylene-2-phenylindole, M.P. 140° C., could be obtained.

Figure 6:
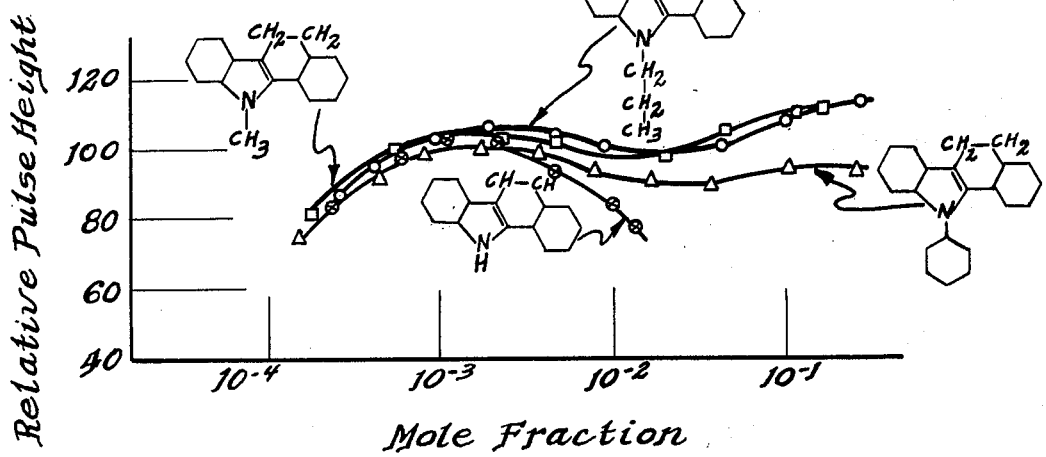

FIG. 6 shows the RPH versus mole fraction of certain compounds within this class. This class of compounds, except for that with only H atom on the N atom, show no self-quenching. Also the before mentioned increase in scintillation efficiency at high concentrations is also present.

Several of these new compounds have the unique property of assuming a non-crystalline, glassy state at room temperature. Upon melting these compounds, normally crystalline at room temperature, and recooling to room temperature an organic glass is obtained which in some cases is stable for very long periods of time, more than one year. Most of these organic glasses are also quite good scintillators, about 70–120% the scintillation efficiency of the standard PPO-toluene-deaerated scintillator solution.

The best of these glasses we have found to date is

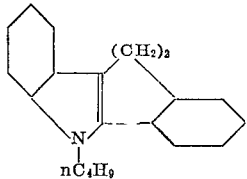

with which an RPH of 120 is obtained. Also

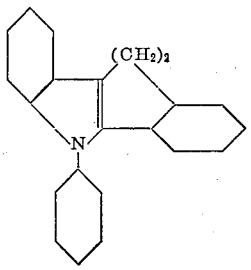

forms a glass whose relative pulse height is 85. A stable glass is also formed by N-phenyl-2-phenylindole and the relative pulse height obtained with this compound is 70. Likewise several of the methylene compounds form glasses as do some 3-substituted 2-phenylindoles. Use of these compounds as organic scintillators offers the advantage that use of a diluent as solvent is not necessary.

It is also understood that the invention is not to be limited to the details given herein but that it may be modified within the scope of the appended claims.

The embodiments of the invention in which an exclusive property or privilege is claimed are defined as follows:

1. A method for detecting and measuring ionizing radiation comprising directing said radiation into an organic scintillator solution in toluene of N-n-butyl-2-biphenylindole,

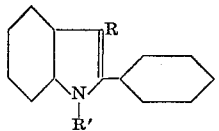

wherein R is methyl or phenyl and R' is hydrogen or methyl, or

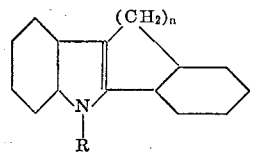

wherein R is a lower alkyl or phenyl and $n$ is 1 or 2.

2. A method according to claim 1 wherein the solution is a solution in toluene of N-n-butyl-2-biphenyl indole.

References Cited

UNITED STATES PATENTS

| | | | |
|---|---|---|---|
| 2,980,549 | 4/1961 | Craig | 117—33.5 |
| 2,751,393 | 6/1956 | Schindler et al. | 260—390.6 |
| 2,510,428 | 5/1948 | Standen | 167—33 |

OTHER REFERENCES

Chemical Abstracts 54:19643h, 59:1956e, 65:10553f, 65:20087g, 63:13194f, 62:1216C, 55:18124g.

"Recueil des Travaux Chim.," vol. 62, pp. 763–783 (12/1944).

TOBIAS E. LEVOW, Primary Examiner

W. T. SCOTT, Assistant Examiner

U.S. Cl. X.R.

250—71; 252—301.2, 301.3; 260—319.1